Jan. 5, 1937.    G. R. FISHER    2,066,561
METALLOSCOPE
Original Filed Jan. 16, 1933    2 Sheets-Sheet 1
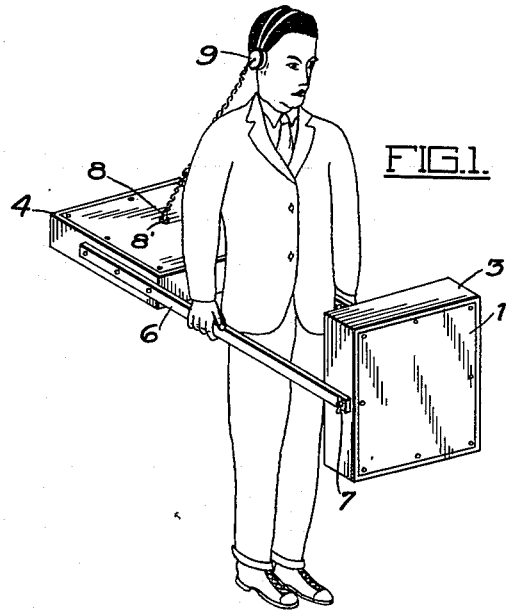
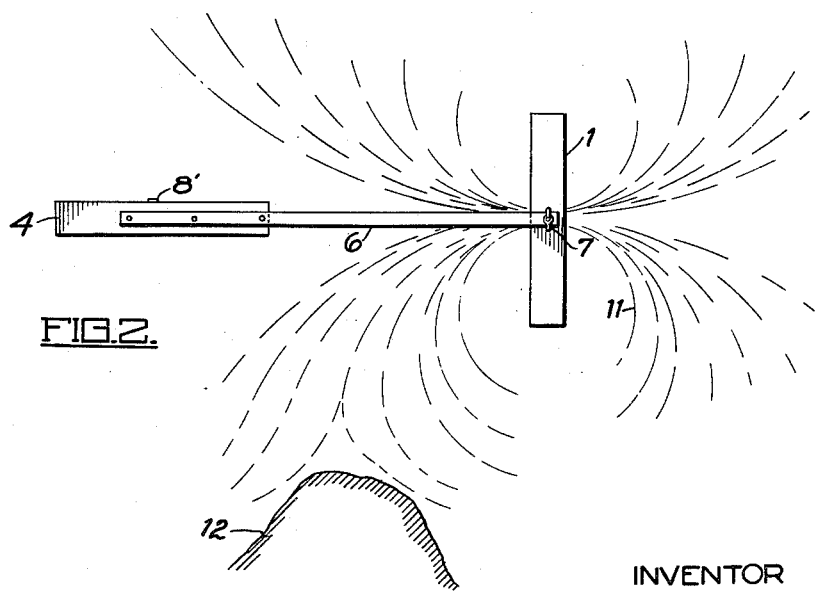
INVENTOR
GERHARD R. FISHER.
BY W E Beatty
ATTORNEY Jan. 5, 1937.  G. R. FISHER  2,066,561
METALLOSCOPE
Original Filed Jan. 16, 1933 2 Sheets-Sheet 2
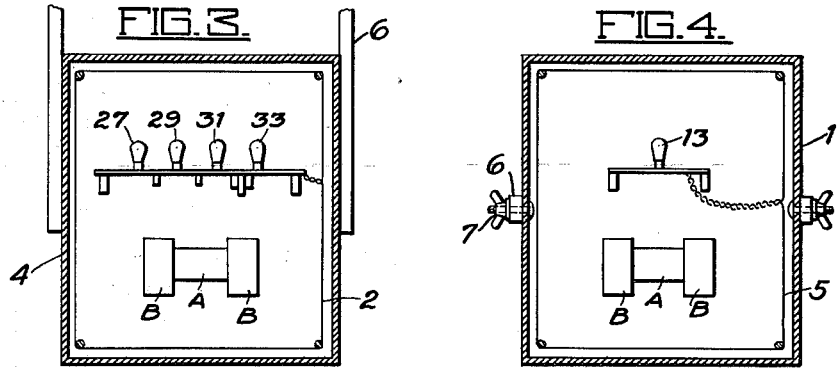
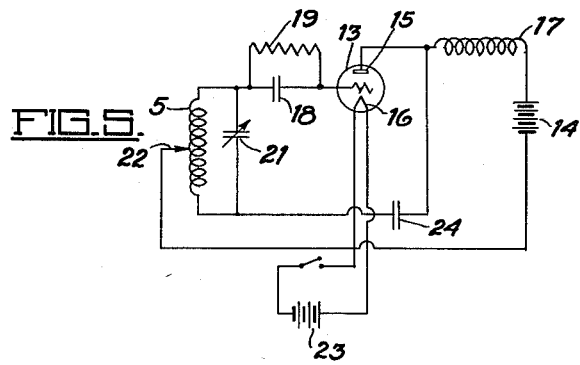
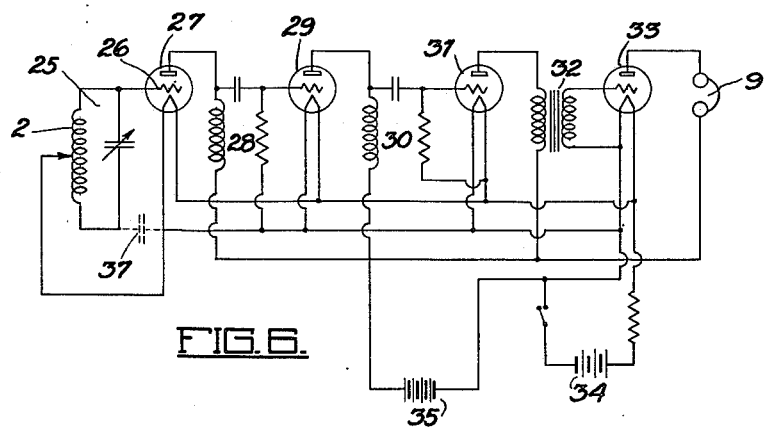
INVENTOR
GERHARD R. FISHER.
BY
W E Beatty
ATTORNEY Patented Jan. 5, 1937

2,066,561

UNITED STATES PATENT OFFICE 2,066,561

METALLOSCOPE

Gerhard R. Fisher, Palo Alto, Calif.

Application January 16, 1933, Serial No. 651,974
Renewed August 6, 1936

3 Claims. (Cl. 175—182)

The invention relates to a metalloscope; that is, to method and means for indicating the presence of buried metals such as ore, pipes, or the like.

According to other methods in use, it has been proposed to send an electrical current or a magnetic field into the earth and to make observations as to the equal potential lines or as to the magnetic conditions set up in the earth, and thereby calculate the presence of metal or perhaps faults in the surface of the earth. Such methods have the very great disadvantages that it is necessary to make a large number of observations and therefrom to calculate the results, which involves considerable expense and delay.

An object of the present invention is to provide a simple apparatus which is preferably unitary and which is entirely portable, for instantaneously indicating the presence of metal, such as buried ore, pipes, or the like.

This is accomplished by generating electrical waves in balanced relation to a receiver, whereby the balanced relation is upset when the apparatus is brought into the vicinity of a metallic body, this unbalanced condition arising from the fact that the field is generated in such a way that the metallic body affects one portion of the field more than it does the other.

For further details of the invention reference may be made to the accompanying drawings, wherein:

Fig. 1 illustrates schematically the invention in use.

Fig. 2 illustrates the electro-magnet field set up by the apparatus and the unbalanced condition of the field due to the presence of metal.

Fig. 3 is a vertical section of the receiver shown in Fig. 1.

Fig. 4 is a vertical section of the transmitter of Fig. 1.

Fig. 5 is a circuit diagram of the transmitter.

Fig. 6 is a circuit diagram of the radio receiver.

Referring to Fig. 1, the apparatus comprises a radio transmitter 1 having a vertical loop 2 therein, as shown in Fig. 3. This transmitter is conveniently housed in a box 3 as shown in Fig. 1, and the receiver 4 is arranged in a similar horizontal box. The loop antenna 5 for the receiver, however, extends in a horizontal direction. The transmitter 1 and the receiver 4 are in effect a unitary apparatus by reason of the fact that the handles 6 connect them to each other, these handles for instance, being rigidly fastened at one end to the receiver and adjustably fastened at the other ends by means of wing nuts 7.

The transmitter 1 and receiver 4 are preferably spaced apart a sufficient distance, and are preferably wide enough so as to permit the operator to stand between the two handles 6 and between the transmitter and receiver, as shown in Fig. 1, whereby the apparatus may be conveniently carried.

The receiver 4 is provided with a jack 8' to receive the plug 8 connected to the headphones 9.

Referring to Fig. 2, the transmitter 1 sets up one field portion 10 above the horizontal plane and another field portion 11 below the horizontal plane. These two field portions, in the absence of metal in proximity thereto, being identical in strength and distribution. The receiver 4 in lying horizontal is acted on similarly by these two fields and therefore when the transmitter 1 sends out modulated high frequency waves (30,000 cycles or higher modulated by an audible tone such as 500 cycles) the receiver 4 will detect these radio waves and the 500 cycle tone will be audible in the headphones.

Theoretically at least, with the receiver 4 in horizontal position, no waves should be detected in the position indicated in Fig. 2, because the loop antenna is at right angles to the transmitter. In actual practice, however, the receiving loop is not confined to a single plane as it is a spiral and a very small amount of indication has been observed in the headphones even with the apparatus as arranged in Fig. 2. Therefore, in practice, instead of getting a zero indication with the parts as in Fig. 2, actually a tone of small volume is observed.

If now the apparatus is brought in a horizontal position into proximity to buried metal indicated at 12 in Fig. 2, the lower field portion 11 will be modified due to the opposing induced field set up in the metal 12, thereby increasing the intensity of the field 11 which produces a stronger tone indication in the headset 9, thereby indicating the presence of metal.

The metal 12 may be a body of ore, a pipe buried under the ground, buried treasure or the like. In actual practice, the apparatus has been successfully used in all of these instances.

The distance apart of the transmitter and the receiver is not determined solely by the convenience of permitting the operator to stand between them, as shown in Fig. 1. In fact the transmitter and the receiver may be separate units, in which case the transmitter 1 may be placed in a vertical position on the ground or on any suitable support and the receiver 4 held in a horizontal position and moved about the transmitter at different angles and distances therefrom.

The depth to which the apparatus is effective is a function not only of the distance apart of the transmitter and receiver but also of the frequency used. Generally speaking, the apparatus is effective for a depth comparable to the distance apart of the transmitter and receiver. It is also evident that the greater the power of the transmitter, the greater the depth which can be explored.

As to the frequency, I have found that 175 kilocycles is satisfactory for the apparatus arranged as shown in Fig. 1 and for exploring depth of from 0 to 10 feet. High frequencies make it easier to detect smaller objects but the apparatus then becomes effective for shallower depths due to absorption of the very high frequency energy by the ground.

The transmitter 1 may conveniently be a vacuum tube oscillating circuit as shown in Fig. 5. While a Hartley type oscillator is here shown, any other suitable type of oscillating circuit may be used. This oscillating circuit comprises a vacuum tube 13, having a B battery 14 connected between the anode 15 and cathode 16. In circuit therewith is a retard coil 17. The grid circuit includes a condenser 18 of .00025 m. f., shunted by a resistance 19 of about 2 megohms.

In series in the grid circuit is a loop circuit comprising inductance 5 shunted by a variable condenser 21 and from an intermediate point on the inductance 5, a tap 22 is taken to the negative terminal of the filament battery 23. The tuned circuit 5 and 21 is in series with a stop or feedback condenser 24, the other terminal of which is connected to the plate 15. Energy is therefore fed back from the plate circuit to the grid circuit and at a super audio frequency, and the frequency thereby generated is interrupted at an audio rate such as 500 cycles by reason of the high resistance 19 in shunt to the condenser 18. The circuit in Fig. 5 therefore serves to generate high frequency current modulated at an audio frequency rate, without however the generation of audio frequency currents. The advantage of interrupting the radio frequency waves at an audio frequency rate without generating modulating current of audio frequency is that it becomes necessary to balance the transmitter and the receiver only at a radio frequency and not at an audio frequency. The difficulty of attempting to balance the transmitter and receiver both at a radio and at an audio frequency will be well understood. This difficulty is avoided by the modulating arrangement herein provided, as above described.

The A and B batteries of Fig. 5 and the vacuum tube 13 may be conveniently arranged as shown in Fig. 4, the energy being radiated from the coil 5 of Fig. 5 which is illustrated as loop antenna 5 in Fig. 4.

The circuit for the receiver 4 is illustrated in Fig. 6 wherein the loop 25 is tuned to the high frequency generated by the circuit in Fig. 5. One terminal of this loop is connected to the grid 26 of the R. F. amplifier 27 and the lower terminal of this loop is unconnected to the circuit except for the fact that it is in effect connected to the filament circuit by an inherent capacity illustrated at 37. The capacity illustrated at 37 is a balancing capacity and equals in value the capacity from the grid 26 to the cathode of the tube 27, whereby in effect equal capacities are found at the terminals of the loop 25. The R. F. amplifier 27 is connected through a choke coil coupling 28 to a second R. F. amplifier 29 which, in turn, is connected through a choke coil coupling 30 to the detector 31 which in turn, is coupled through an audio frequency transformer 32 to an audio frequency amplifier 33, in the output circuit of which are the headphones 9. The jack 8' in Fig. 1 is preferably a double jack so that it serves not only to connect the headphones 9 to the output circuit of the amplifier 33 but also serves to close the circuit of the A battery 34. The B battery for the tubes shown in Fig. 6 is illustrated at 35. The A and B batteries and the tubes in Fig. 6 may be conveniently arranged as illustrated in Fig. 3, the loop 2 being supported on wooden pins around the inside of the periphery of the box 4, just as in Fig. 4, for the transmitter.

As shown in Figs. 3 and 4, and as is obvious from Figs. 1 and 2, the A and B batteries and all circuit connections are arranged within their respective loops 2 and 5, whereby there is no radio frequency potential difference outside of each loop (and between each loop and its batteries or circuit connections) because the batteries and circuit connections are wholly contained within their respective loops. If, for example, the A and B batteries in Fig. 3 were placed on the ground outside of the box 4 and connected thereto by wires, these connecting wires would function as a vertical antenna to give an open antenna effect which would render the apparatus substantially impractical for the reason that the radio frequency current in an open antenna is 90° out of phase with the current in a loop, which would make it practically impossible to set the receiver in Fig. 4 into a minimum position for both of these currents as is well understood in the compass art.

Furthermore, in the case last assumed, it would be necessary to balance the receiver for each setup of the transmitter due to the fact that the capacity to ground is different in different localities.

Therefore, by arranging the A and B batteries with the tube circuits therefor inside of their respective loops, such difficulties are avoided and it is a very simple operation to arrive at the angular position of the receiver for minimum tone reception.

Having thus described the invention, what is claimed as new and desired to secure by Letters Patent is:

1. Metal finding apparatus comprising the combination of means for radiating modulated high frequency waves, means for receiving and demodulating said waves, separate containers for said radiating means and for said demodulating means, and handles spaced apart a sufficient distance to permit an operator to stand between said containers for mechanically connecting said containers to provide a portable unit, said radiating means and said receiving means each comprising a loop, the axes of said loops being substantially at right angles, the connecting means between said handles and said containers comprising means for varying the angular relation of said loops.

2. The method of indicating the presence of metal which comprises supplying an audio frequency modulated high frequency wave to an ungrounded loop and thereby radiating waves in space free from ground waves, said radiating being directed so that the field on one side of the axis of said loop is in a region to be explored and the field on the other side of said axis is not in a region to be explored, receiving both of said fields in fixed balanced relation in a non-oscillating receiver, upsetting said balance in said non-oscillating receiver by the presence of metal, and translating said unbalanced condition into an indication.

3. The method of indicating the presence of metal which comprises generating an audio frequency modulated high frequency wave without generating audio frequency current, radiating said wave to produce a field in the region to be explored and an equal field outside thereof, without conductively producing earth currents due to said generating, translating the modification of said first mentioned radiated field due to the presence of metal, in comparison to said second mentioned field into a signal which indicates such presence simultaneously with the receipt of modulated high frequency waves producing the signal, and in thus translating the received waves into the signal without locally generating oscillations at the receiver.

GERHARD R. FISHER.